(12) United States Patent
Azima

(10) Patent No.: US 6,244,293 B1
(45) Date of Patent: Jun. 12, 2001

(54) FLUID MASS FLOW CONTROLLER DEVICE AND METHOD

(76) Inventor: Faramarz Azima, 376 9th St., P.O. Box 370247, Montara, CA (US) 94037

( * ) Notice: Subject to any disclaimer, the term of this patent is extended or adjusted under 35 U.S.C. 154(b) by 0 days.

(21) Appl. No.: 08/892,794

(22) Filed: Jul. 15, 1997

(51) Int. Cl.[7] .................................................. G05D 7/06
(52) U.S. Cl. ........................................ 137/486; 137/487.5
(58) Field of Search ................................. 137/486, 487.5

(56) References Cited

U.S. PATENT DOCUMENTS

| | | | |
|---|---|---|---|
| 3,335,748 | * 8/1967 | Klemm et al. | 137/501 |
| 4,015,626 | * 4/1977 | Thordarson | 137/501 X |
| 4,440,021 | 4/1984 | Abouchar et al. | 73/204 |
| 4,484,472 | 11/1984 | Licinit et al. . | |
| 4,487,062 | 12/1984 | Olin et al. . | |
| 4,517,838 | 5/1985 | Wachi et al. . | |
| 4,519,246 | 5/1985 | Hartemink . | |
| 4,548,075 | 10/1985 | Mariano . | |
| 4,569,504 | 2/1986 | Doyle | 251/129.15 |
| 4,667,153 | 5/1987 | Doyle | 324/130 |
| 4,684,886 | 8/1987 | Doyle | 324/132 |
| 4,686,856 | 8/1987 | Vavra et al. | 73/204 |
| 4,687,020 | 8/1987 | Doyle | 137/486 |
| 4,815,280 | 3/1989 | Tujimura et al. . | |
| 4,858,643 | 8/1989 | Vavra et al. | 137/486 |
| 4,928,048 | 5/1990 | Doyle | 318/644 |
| 5,080,131 | 1/1992 | Ono et al. | 137/599 |
| 5,100,100 | * 3/1992 | Benson et al. | 137/486 X |
| 5,141,021 | 8/1992 | Shimomura et al. | 137/486 |
| 5,159,951 | 11/1992 | Ono et al. | 137/486 |
| 5,191,793 | 3/1993 | Drexel et al. . | |
| 5,259,243 | 11/1993 | Drexel et al. . | |
| 5,347,861 | 9/1994 | Satoh . | |
| 5,447,173 | 9/1995 | Kazama et al. | 137/8 |

FOREIGN PATENT DOCUMENTS

WO 94/20006  11/1992  (WO) .
WO 94/09344  4/1994  (WO) .

* cited by examiner

Primary Examiner—Gerald A. Michalsky
(74) Attorney, Agent, or Firm—Townsend and Townsend and Crew, LLP

(57) ABSTRACT

The present invention provides a technique for controlling a wide range of fluid flow rates through a mass flow controller ("MFC") device 10. The technique includes a device 10 having a novel housing design and a variety of by-pass elements 300, 400 for selectively providing a desired fluid flow range.

37 Claims, 6 Drawing Sheets

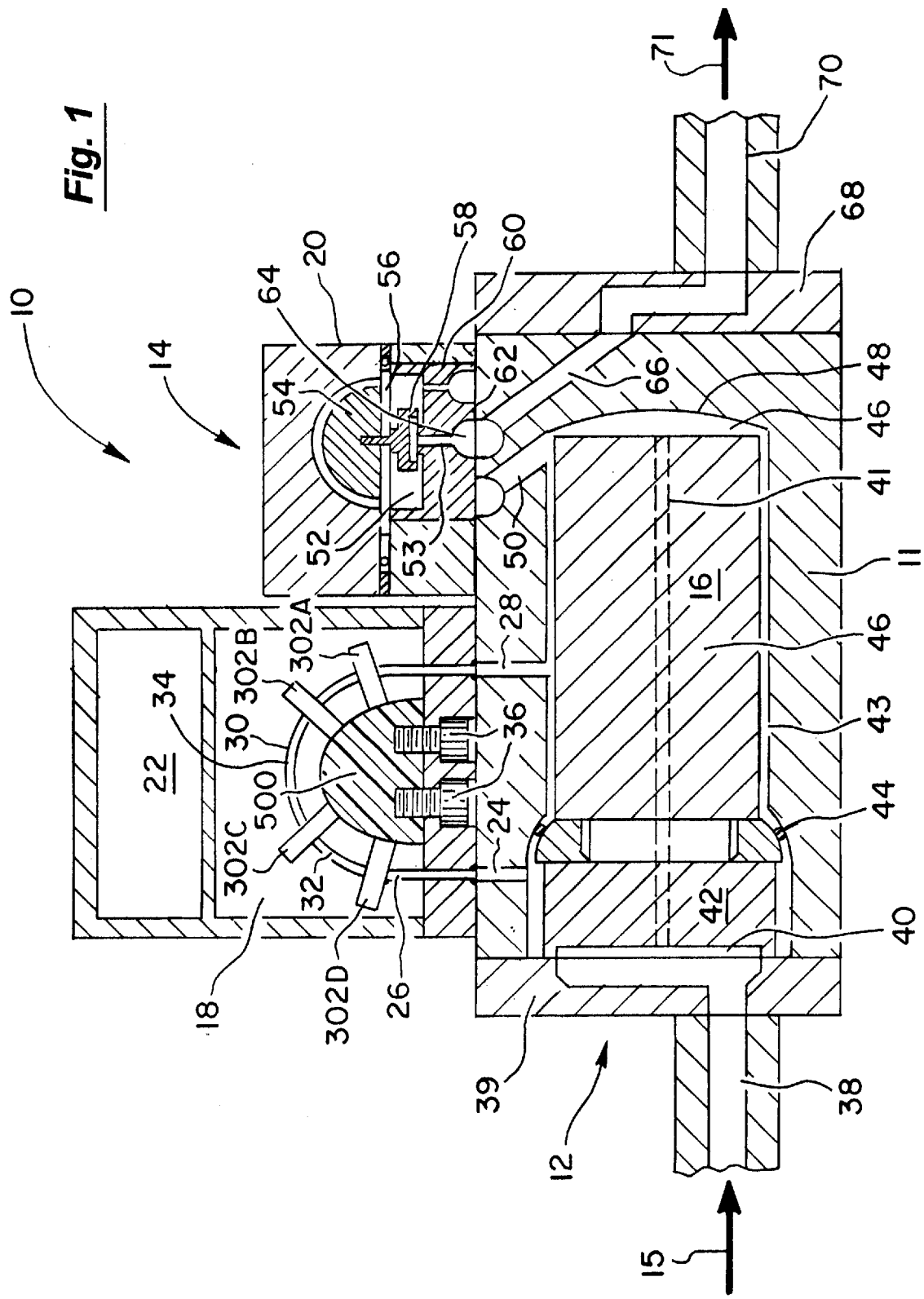

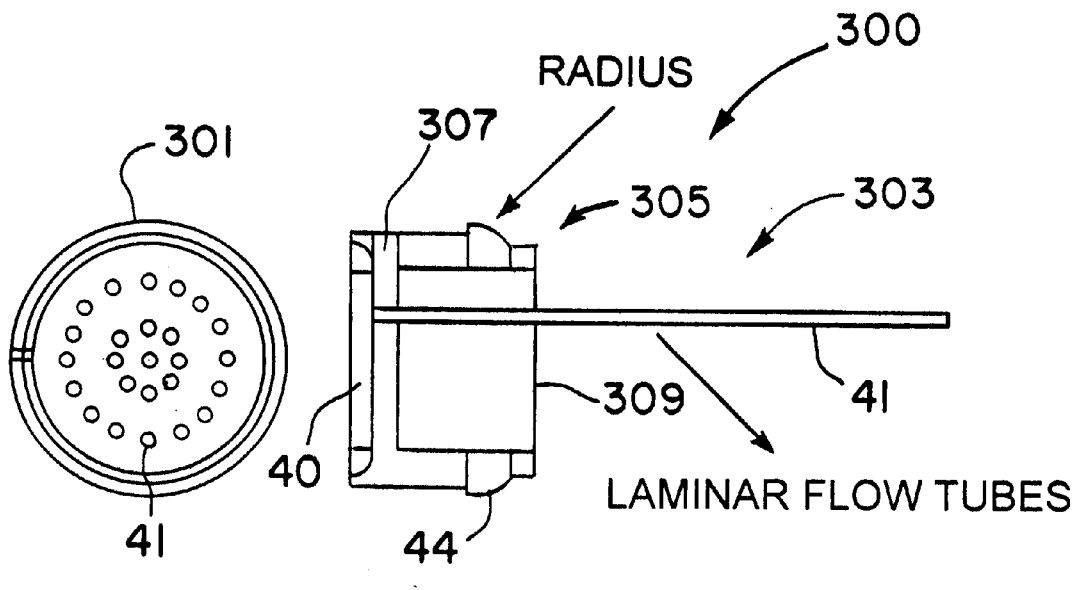
Fig. 3B  Fig. 3A
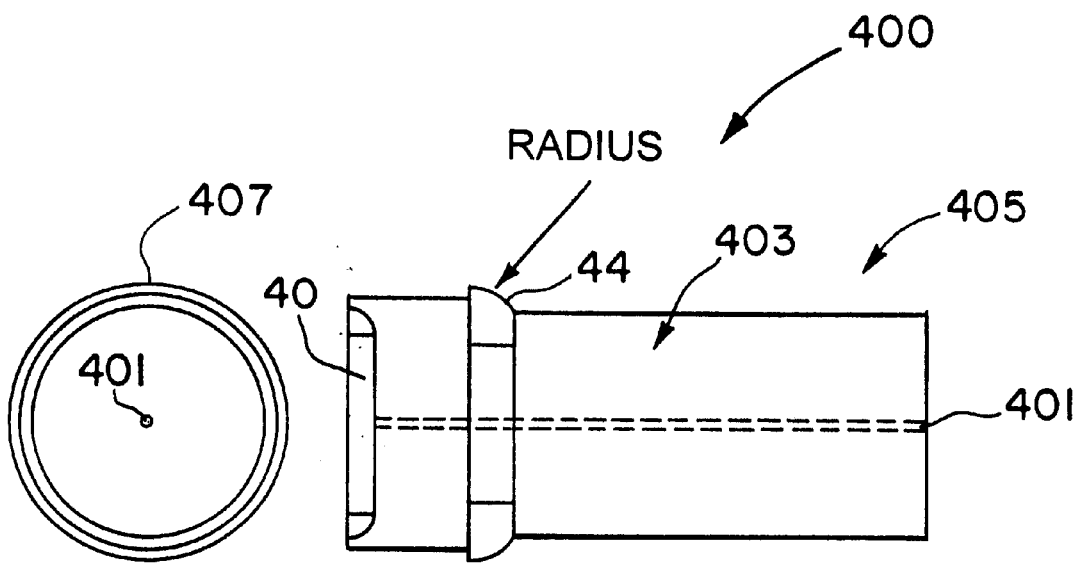
Fig. 4B  Fig. 4A

FLUID MASS FLOW CONTROLLER DEVICE AND METHOD

BACKGROUND OF THE INVENTION

The present invention relates to a mass flow controller, commonly termed MFC. More particularly, the present invention provides a novel technique including a device and method for maintaining a fluid flow rate of fluids used in, for example, semiconductor processing or the like. Merely by way of example, the present invention is illustrated using a device and methods related to integrated circuit processing. But it will be recognized that the present invention also can be applied to the manufacture of products such as flat panel displays, hard disk drives, and others.

In the manufacture of semiconductor integrated circuits, process complexity and wafer size tends to increase with time. For instance, wafer size has increased from one inch up to six inch over the past thirty years. Larger sized wafers such as eight inch are now being used. Twelve inch wafers and larger are being proposed. As wafer size and complexity of processing increase, gases used for the manufacture of the integrated circuits also become more important. In particular, control of a selected flow rate range for a process step (e.g., plasma etching ("PE"), chemical vapor deposition ("CVD")) becomes rather important. Accordingly, mass flow controllers have been used to selectively control fluid flow rates of selected process steps.

Numerous mass flow controllers are presently on the market today. Manufacturers of mass flow controllers include, among others, Unit Instruments, Inc. ("Unit"), Brooks Instruments ("Brooks"), and Tylan General ("Tylan"). These manufacturers generally have a broad range of products to cover a variety of flow ranges, which are used in the manufacture of integrated circuit devices. For instance, Unit has at least ten different products for the purpose of covering a variety of flow rate ranges. Tylan has at least seven different products. As for Brooks, it has about eight products or more for covering different fluid flow ranges.

A limitation with these conventional mass flow controllers is their sheer number, where each controller can often be used for a limited fluid flow range. The sheer number of these mass flow controllers often translates into large numbers of different controller units being used and stored for replacement in the manufacturing line or semiconductor fabrication plant, commonly termed wafer fab. Accordingly, it is often quite expensive and time consuming to keep available all necessary spare parts to replace faulty or broken mass flow controllers.

Additionally, conventional mass flow controllers can often be adjusted to accommodate a relatively narrow flow rate range, which makes it often impossible or highly impractical to modify such conventional mass flow controllers to accommodate a different and often higher fluid flow rate. Therefore, companies such as Unit generally introduce a new mass flow controller to replace pre-existing controllers. This replacement process often translates into discarding older mass flow control units for newer ones at the expense of the wafer fab or wafer manufacturer.

From the above, it is seen that a mass flow controller which is cost effective and efficient is often desirable.

SUMMARY OF THE INVENTION

According to the present invention, a technique including a device and method for maintaining a fluid flow rate of a fluid used in, for example, semiconductor processing or the like is provided. In an embodiment, the present invention provides a device having wide fluid operating ranges, which are used in a variety of semiconductor processing operations.

In a specific embodiment, the present invention provides a fluid mass flow control device having a novel body design to allow for a wide variety of fluid flow rates. The device includes a main body, and an elongated fluid flow cavity in the main body. The fluid flow cavity is coupled (e.g., connected) to a fluid inlet/outlet. A control valve is coupled or connected by way of at least one orifice(s) between the fluid flow cavity and a fluid outlet/inlet. To increase capacity of fluid flow, the elongated fluid flow cavity is disposed underlying a portion of the control valve (or overlaps a region occupied by the valve) to increase a fluid flow path of the elongated fluid flow cavity. This fluid flow cavity allows for a variety of fluid flow rates.

In an alternative specific embodiment, the present invention provides a method for controlling fluid flow in a fluid flow device. The method includes a step of providing a fluid flow at an inlet of an elongated fluid flow cavity. The fluid is flowed through the elongated fluid flow cavity in a first direction in a laminar flow manner. The fluid is also flowed from the elongated fluid flow cavity to a control value through a first orifice in a second direction. The second direction has a directional element that is opposite of the first direction. By traversing in the direction opposite to the first direction, the present method can provide a longer elongated fluid flow cavity, which provides, for example, a wider variety of fluid flow ranges.

In yet another embodiment, the present invention provides a method of fabricating a fluid flow controller using a novel body design. The method includes a step of providing a main body, which has an elongated fluid flow cavity in the main body. This elongated fluid flow cavity is generally capable of more than one fluid flow range. To provide a desired fluid flow range, a selected by-pass element is chosen to provide fluid flow operable within the desired fluid flow range. The by-pass element is placed and assembled into the elongated fluid flow cavity. Other by-pass elements can also be selected to provide numerous other fluid flow ranges, depending upon the application.

The present invention further provides a method for modifying a fluid flow controller from a first fluid flow range to a second fluid flow range, which is different from the first fluid flow range. The method includes a step of providing a first fluid flow controller operable in a first range of fluid flow. The first fluid flow controller includes a first by-pass element for the first fluid flow rate. The method uses a step of replacing the first by-pass element with a second by-pass element for the second fluid flow rate to form a second fluid flow controller operable in the second range of fluid flow. The second fluid flow rate can be different from the first fluid flow rate. This sequence of steps allows for modification of MFCs according to the present invention to provide desired flow rates. That is, the present MFC is not designed or limited to provide a single range of narrow flow rates as pre-existing techniques.

Numerous benefits are achieved by way of the present invention over preexisting techniques. In particular, the present invention can provide a single mass flow control body for low and high fluid flow rates, which cannot be accurately detected by way of pre-existing techniques. Additionally, the present invention provides a main chamber housing that is easily modifiable to use numerous by-pass elements for use with selected ranges of fluid flow, which are generally wider than preexisting techniques. The present invention also provides a technique for modifying a first fluid flow controller designed for and operable at a first fluid flow range to a second fluid flow controller operable at a second fluid flow range, which cannot be done with pre-existing techniques. Additionally, the present invention provides a single mass flow controller operable over a wide range of flows, typically much wider than pre-existing techniques. Accordingly, the present invention achieves these benefits and others, which will be described in further detail throughout the specification.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

FIGS. 3A–3B illustrates simplified diagrams of a by-pass element according to the present invention;

FIG. 4 illustrates simplified diagrams of an alternative by-pass element according to the present invention;

DESCRIPTION OF A SPECIFIC EMBODIMENT

Figure 1C:
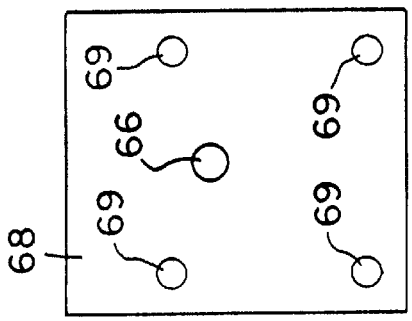
FIGS. 1–1E are simplified diagrams of a fluid or mass flow controller according to the present invention.
Figure 1D:
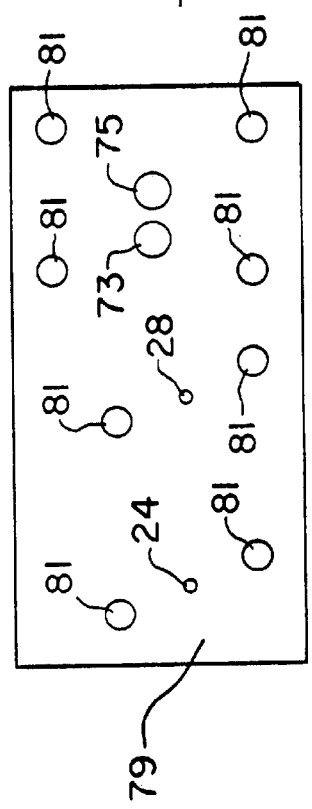
Figure 1A:
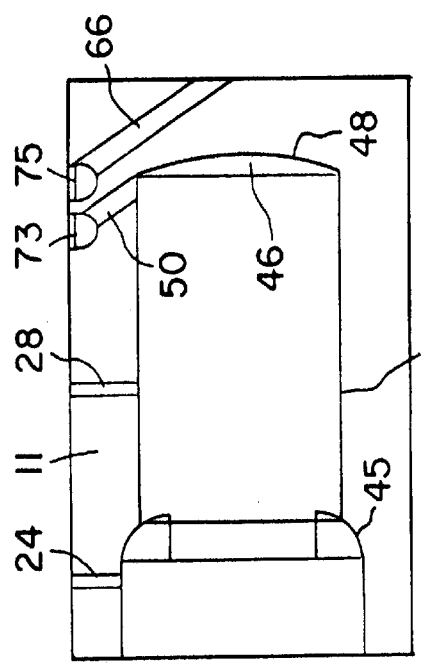

The present invention provides a technique including a device and method for maintaining a fluid flow rate of fluids used in, for example, semiconductor processing or the like. In an embodiment, the present invention provides a device capable of having large or wide fluid operating ranges, which are used in a variety of semiconductor processing operations. Large fluid operating ranges are achieved by way of a novel chamber design and selected by-pass elements. In an alternative embodiment, the present invention provides a technique for fabricating a mass fluid flow controller, which uses a common main body and selected by-pass elements.

1. Present Mass Flow Controller

Mass flow controllers, commonly termed MFCs, are used whenever accurate measurement and control of a gas(s) is desired. MFC includes a mass flow meter, a proportional controller, and other elements. FIG. 1, for example, illustrates simplified side-view diagrams of a mass or fluid flow controller 10 according to the present invention. This diagram is merely an illustration and should not limit the scope of the claims herein. One of ordinary skill in the art would recognize other variations, alternatives, and modifications.

The MFC 10 generally includes a mass flow meter 12, a controller 14, and other elements. The mass flow meter 12 divides fluid flow 15 between a flow restriction element or by-pass element 16, where most of the flow passes, and sensing tube 26, where mass flow is measured. Sensing tube 26 is located in a sensing unit 18. Controller 14 includes, among other elements, a variable displacement solenoid valve 20 and control electronics 22. The controller 14 drives the valve to a position so that measured flow equals a desired flow 71 set-point for a particular process. In operation, for example, fluid 15 flows into the MFC through inlet 38. Inlet 38 couples to end-cap 39, which seals one end of housing or main body 11. Fluid flows through an orifice in end-cap 39 into chamber 40, which couples to by-pass element 16. By-pass element 16 includes one or more laminar flow tube(s) 41, which allows fluid to flow in a laminar manner through the by-pass element 16.

By-pass element 16 is generally removable from the main chamber 43 of the main body 11. In particular, by-pass element 16 is insertable into main chamber 43 when end-cap 39 is not present. By-pass element 16 is replaceable or detachable from main chamber 43 in the main body 11 by removing end-cap 39, which holds and seals the by-pass element 16 into place of the main body 11. Bypass element also includes region 42 for holding or clustering one or more of the laminar flow tubes into the by-pass element. Region 44 of the by-pass element includes an annular periphery (i.e., rounded corners) to seal the by-pass element to the main chamber 43 of main body 11. Fluid traverses through one or more of the laminar flow tubes and exits into chamber 46, which is coupled to valve 20 through orifice 50. Chamber 40 may have an annular or concave structure 48 (e.g., rounded) to facilitate fluid flow from one or more laminar flow tubes to the orifice 50.

By-pass element 16 also has a relatively long elongated structure for providing a wide range of fluid flow ranges. By-pass element 16 makes effective use of the main body by extending into a region underlying the sensing unit 20. In some embodiments, by-pass element takes up a length greater than about 70% or 80% or 90% or 95% of the length of the main body 11. More preferably, by-pass element takes up a length greater than about 90% of the length of the main body. In most embodiments, main body includes a length of about five or four or three and one-half, or preferably three inches and less, but can be greater. This length generally allows the main body or the MFC to be placed in process lines between a source gas and a processing chamber. Additional details regarding the by-pass element are described below.

Sensing unit 18 is coupled to the main body 11 by way of orifice 24 and orifice 28. Sensing unit 18 is also coupled mechanically to main body 11 using, for example, fasteners 36, e.g., screws, bolts. A portion of fluid flows from region 42 of the by-pass element into orifice 24. Orifice 24 is an annular region which provides fluid into sensing tube 26. Sensing unit also includes temperature sensing elements 32 and 34 for monitoring a difference in temperature between orifice 24 and orifice 28. Additionally, sensing unit includes heater elements 30, which are often resistive coils, for adding heat to the fluid through the periphery of the sensing tube 26. Fluid leaves sensing unit 18 through orifice 28 and enters by-pass element 16.

Fluid leaves by-pass element through orifice 50 and enters valve 20, which selectively adjusts fluid flow to a desired set-point. Fluid leaves orifice 50 and enters chamber 52 in the valve 20. From the chamber 52, fluid traverses under valve seat 58, through orifice 53, and out orifice plate 60, which selectively adjusts fluid flow through valve element 64. A combination of at least plunger assembly 54 and valve spring 56 actuates valve element 64 to selectively control fluid flow through the valve. Upon traversing through orifice plate 60, fluid enters and traverses through orifice 66. Orifice 66 allows fluid to enter into a chamber in end-plate 68, which is connected or coupled to outlet 70. Fluid 71 exits from outlet 70 to, for example, a processing chamber or the like. The processing chamber can be, among others, a chamber for etching, a deposition chamber, a sputtering chamber, and an implantation chamber.

As shown, valve 20 couples to by-pass element 16 using orifice 50, for example. Orifice 50 is formed in the main body at an angle from normal to by-pass element flow or the by-pass element itself, which is generally disposed parallel to fluid flow. In particular, orifice 50 provides fluid to flow in a somewhat "backward" manner, since the opening to valve chamber 53 is slightly downstream from chamber 46 of the main body. This slightly backward directing orifice 50 allows for effective utilization of space for the by-pass element in the main body. Alternatively, orifice 50 can be formed into the main body in a variety of other configurations or geometries to effectively use a greater portion of the main body for laminar fluid flow. In relation to the by-pass element, a portion of the laminar flow region of the by-pass element overlaps a region occupied by the sensing unit. That is, by-pass element extends underlying at least a center region of the valve, or preferably underlying a substantial portion of the valve. Of course, depending upon the application other configurations can also be used to effectively increase the laminar flow region of the by-pass element to provide a greater range of fluid flow.

Figure 1E:
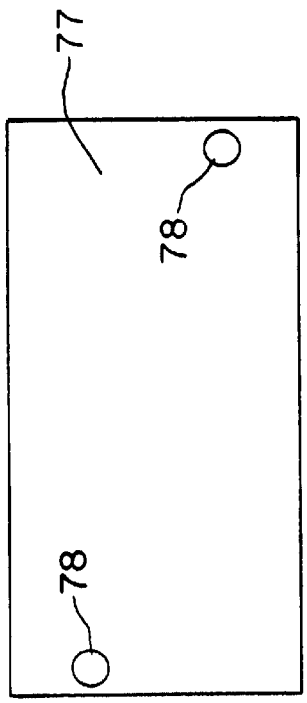
Figure 1B:
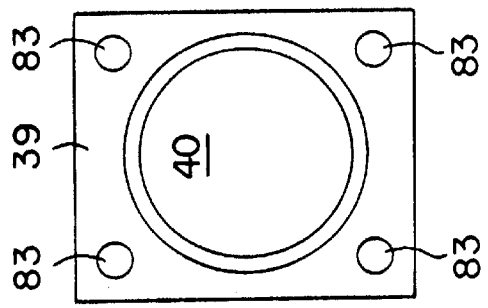

FIGS. 1A–1E illustrate simplified diagrams of the mass flow controller of FIG. 1, according to the present invention. The diagrams include a side view 11 of the main body (FIG. 1A), a front view of end-cap 39 (FIG. 1B), a front view of end-cap 68 (FIG. 1C), a top plate 79 (or interface plate between main body, and sensing unit and valve unit), and a bottom plate 77 (FIG. 1E). For easy reading, reference numerals used in these diagrams are similar to the ones in FIG. 1, for example. Main body 11 includes the main chamber 43, which houses by-pass element 16. Main body 11 includes an annular region 45. Annular region 45 provides a cylindrical surface (e.g., rounded surface) to seal main chamber 43 to annular region 44 of the by-pass element. Additionally, main chamber 43 includes a cavity 46 with an annular region 48, which facilitates fluid flow from the by-pass element to the sensing unit. The annular region also enhances corrosion prevention. That is, moisture cannot easily accumulate on the "rounded" surface to prevent corrosion from growing on internal edges of the main cavity. Channels or annular regions 24 and 28 are also shown. Furthermore, orifice S0 and orifice 66 which couple the main body to the valve unit are shown. Each orifice 50, 66 connects or is coupled to an opening or larger region 73, 75. This opening or larger region facilitates fluid flow to and/or from each orifice 50, 60.

FIGS. 1A–1E also includes a variety of other views of the mass flow controller according to the present invention. End-plate 39 includes cavity 40 and openings 83, which can be used to secure the end-plate to the main body by fasteners, e.g., bolts, screws. End-plate 68 has orifice opening 66 and also has openings 69, which can be used to secure the end-plate to the main body by fasteners, e.g., bolts, screws. A bottom view 77 shows openings 78 for securing purposes to a plate. A top view 79 is also shown. The top view shows orifice openings 24 and 28, which provide fluid flow to the sensing unit. Additionally, top view shows orifice openings 73, 75, which provide fluid flow to the valve. A plurality of openings 81 are used to secure the sensing unit and/or the valve to the main body.

In theory, for example, mass flow meter 12 uses thermal properties of a gas to measure mass flow rate. In particular, mass flow meter generally relies upon a principle that each molecule in a gas has a specific ability to pick up heat. The principle relates to a property of the gas commonly termed the "specific heat" ($C_p$), which is the specific heat at constant pressure. The specific heat relates at least to mass and physical structure of the gas and can be determined experimentally or looked up in a reference book such as, for example, the CRC Handbook of Chemistry and Physics, but is not limited to this reference book. The specific heat is often known for a variety of gases and is, for the most part, insensitive to changes in pressure and/or temperature.

Figure 2:
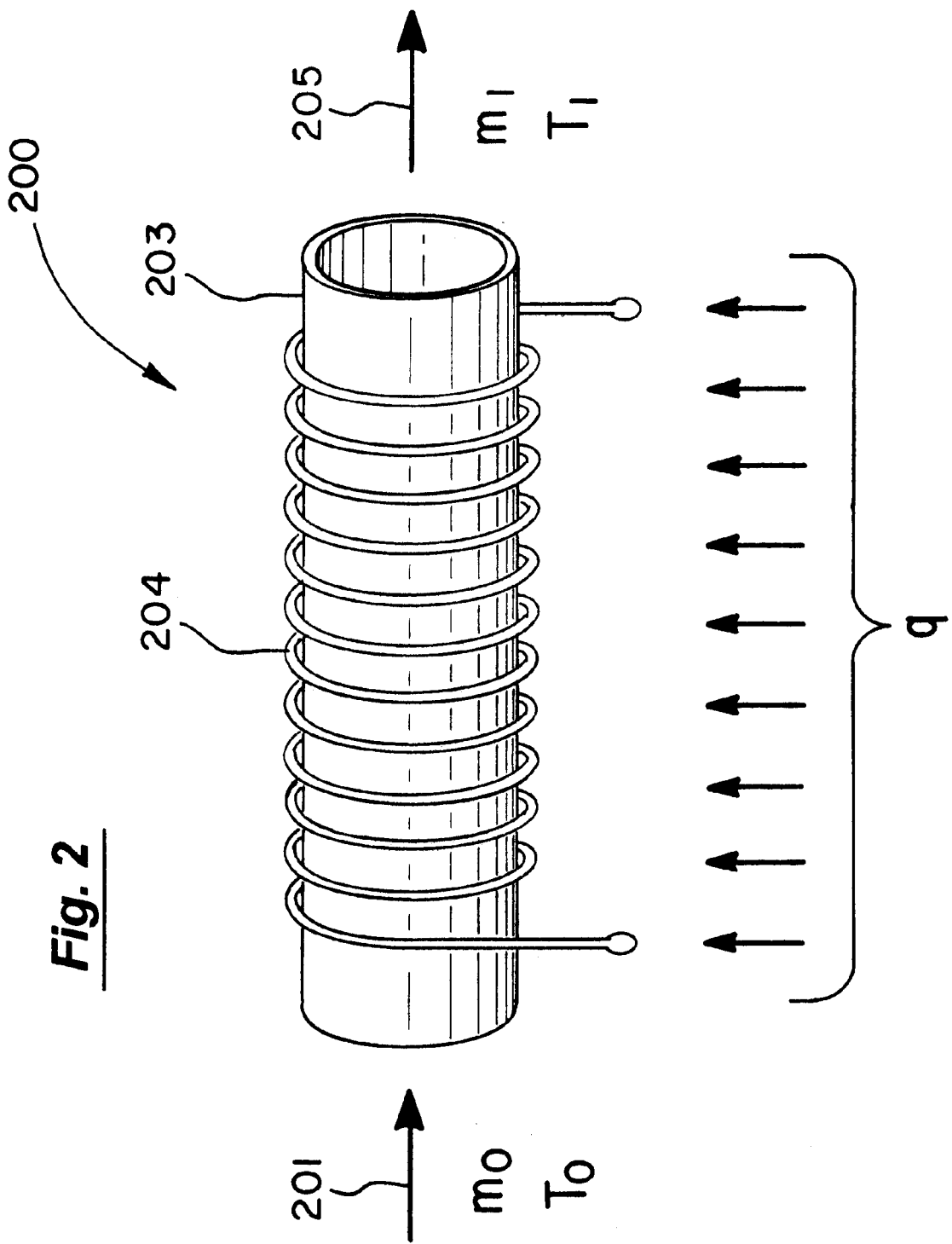
FIG. 2 is a simplified diagram illustrating operation of a mass flow controller according to the present invention.

Mass flow meter 12 operates by adding a selected amount of heat to a gas and monitoring a change in temperature of the gas. By way of the change in temperature and heat, a mass flow rate of the gas can be determined. Referring to FIG. 2, for example, an illustration of mass flow controller operation 200 is depicted. A gas 201 enters sensing tube 203 at an initial temperature ("$T_o$") and mass flow rate ("$m_0$"). Heat ("q") is applied to the tube to increase temperature of the gas in the tube 203. In particular, resistive heat can be applied to tube 203 using resistive heating element 204. Outgoing gas 205 leaves tube at a higher temperature ("$T_1$") and mass flow rate ("$m_1$"). Conservation of mass suggests that incoming mass flow rate $m_o$ is equal to outgoing mass flow rate $m_1$. A relationship between heat, heat capacity, mass flow rate, and change in temperature is governed by the following equation:

$$q = mC_p dt$$

where q is heat applied to the gas in the tube;

m is mass flow rate;

$C_p$ is heat capacity at constant temperature; and dt is differential change in gas temperature.

Referring to the equation, heat (q) applied to the tube 203 can be measured by way of measuring an electric current at a specific voltage applied to the tube. As noted above, the heat capacity ($C_p$) can be found in a reference book such as, for example, the CRC Handbook of Chemistry and Physics, but is not limited to this reference book. Differential temperature (e.g., $T_o$, $T_1$) also can be measured by way of resistivities. Accordingly, mass flow rate (m) in the sensing tube is readily determined by way of the equation.

Total or net mass flow rate for the mass flow controller can be determined by a flow relation between the sensing tube and the by-pass element. As noted, most of the flow shunts through by-pass element and a portion of the flow splits off into the sensing tube in the sensor. A percentage of fluid flow through the sensing tube is relatively constant in relation to the fluid flow through the by-pass element for a selected fluid flow operating range. By way of measuring the fluid flow passing through the sensing tube, total flow can be determined, as long as the percentage of flow between the tubes remains substantially constant. Preferably, fluid flow through the sensing tube has a substantially laminar profile to maintain accurate fluid flow measurement and preserve the relatively constant flow relation between the by-pass element and the sensing tube.

FIGS. 3A–3B illustrate simplified diagrams of a by-pass element 300 according to the present invention. These diagrams are merely illustrations and should not limit the scope of the claims herein. One of ordinary skill in the art would recognize other variations, alternatives, and modifications. A side-view diagram 303 (FIG. 3A) and a front-view diagram 301 (FIG. 3B) of the by-pass element 300 are shown. By-pass element 300 includes various elements including those noted in the Figs. above. Some of these elements include the plurality of laminar flow tubes 41, which are used to provide laminar flow for a substantial portion of the fluid flow. The laminar flow tubes 41 are disposed in housing 305. Housing 305 includes chamber region 40 and region 44, which has an annular periphery (i.e., rounded corners) to seal the by-pass element to the main chamber. Housing 305 is shaped in a cylindrical manner to be insertable in the main chamber.

In most embodiments, the length of the by-pass element is about the same as the length of the main chamber in the MFC. By-pass element has an overall length ranging from about ¼ inch to about 1 inch. Of course, the particular length of the by-pass element depends upon the application.

The tubes 41 are inserted and fitted into end-plate 307 and end-plate 309, which provide support for the tubes. The front-view diagram 301 illustrates an annular shape and a plurality of holes or openings, each of which defines one of the plurality of tubes. As shown, a larger portion of the end-plate 307 is occupied by tubes. In these embodiments, the by-pass element can generally handle larger fluid flow rates. Depending upon the type of fluid and desired flow rate, the by-pass element uses a selected number and size of the tubes. For example, a tube can have an inner diameter of about 0.030 inches. Seventy of these tubes can be used to provide a flow capacity of about 300 standard liters per minute of hydrogen gas. The tube can be made from a variety of materials, which are generally non-reactive to the fluid introduced into the MFC. These materials include, among others, stainless steel, plastics, products sold under the tradename of TEFLON™, and others.

FIGS. 4A–4B illustrates simplified diagrams of an alternative by-pass element 400 according to the present invention. These diagrams are merely illustrations and should not limit the scope of the claims herein. One of ordinary skill in the art would recognize other variations, alternatives, and modifications. A side-view diagram 405 (FIG. 4A) and a front-view diagram 407 (FIG. 4B) of the by-pass element 400 are shown. By-pass element 400 includes various features including those noted in the Figs. above. Some of these elements include a laminar flow tube 401, which is used to provide laminar flow for a portion of fluid flow. In an embodiment, the by-pass element has a single laminar flow tube, which is fabricated directly into a solid housing 403. Housing 403 also includes chamber 40 and region 44, which has an annular periphery (i.e., rounded corners) to seal the by-pass element to the main chamber. Housing 403 is shaped in a cylindrical manner to be insertable in the main chamber. The front-view diagram 407 illustrates an annular shape and a single opening 401, which defines tube 401. Depending upon the type of fluid and desired flow rate, the by-pass element uses a single opening or tube 401, which is machined into housing 403.

In most embodiments, the length of the by-pass element having the single tube is about the same as the length of the main chamber in the MFC. The single tube by-pass element has an overall length ranging from about 1.5 inches to about 3.0 inches. Preferably, overall length is no greater than about 2 inches or no greater than about 2.15 inches or no greater than about 3 inches. Of course, the particular length of the by-pass element depends upon the application.

Although the above descriptions do not generally mention fluid flow ranges, a combination of selected by-pass elements can provide for a wide variety of fluid flow ranges to be used in the present MFC. In a specific embodiment, a bypass element can provide for a fluid flow range from about 1 to about 5 standard liters/minute (SLM), as standardized to nitrogen gas flow under normal conditions, e.g., 0° C., 760 mT. Additionally, a by-pass element can provide for a fluid flow range from about 5 to about 30 standard liters/minute, as standardized to nitrogen gas flow under normal conditions. Furthermore, a by-pass element can provide for a fluid flow range from about 30 to about 50 standard liters/minute or greater, as standardized to nitrogen gas flow under normal conditions. Moreover, a by-pass element can provide for a flow less than about 1 standard liter/minute, as standardized to nitrogen gas flow under normal conditions. The present MFC provides these and other flow rates.

Although the above descriptions are generally in terms of an MFC using an upstream sensing unit, where the sensor is upstream from a control valve of an MFC. The MFC can also be configured with a downstream sensing unit, where the sensor is downstream from a control valve of an MFC. Additionally, the control valve can be placed at almost any location on the housing or block of the MFC as long as a portion of the main cavity overlaps a region occupied by the sensor. This location makes effective use of the housing or block of the MFC to provide for a larger fluid flow range than pre-existing techniques. Details with regard to various techniques in relation to a mass flow controller according to the present invention are described below.

2. MFC Fabrication Techniques

The present method provides, for example, a relatively simple technique for fabricating MFC's having a diverse range of fluid flow capabilities using a single housing or block design. A method for fabricating a mass flow controller according to the present invention can be briefly described as follows:

(1) Provide a housing or block for an MFC;
(2) Select a by-pass element for a selected fluid flow range;
(3) Insert the by-pass element into a main chamber of the housing;
(4) Assemble end-plate against inserted by-pass element;
(5) Place fasteners to secure end-plate to housing;
(6) Assemble sensing unit on housing;
(7) Assemble control valve unit on housing;
(8) Assemble electronic controller on housing; and
(9) Calibrate MFC to the selected fluid flow range.

The above sequence of steps uses a single housing that can be fitted with a variety of by-pass units to provide a wide range of fluid flow rates. The single housing unit can provide, for example, ease in manufacturing since only a single housing is used in preferred embodiments. Details of these steps are provided by reference to the FIG. below.

Figure 5:
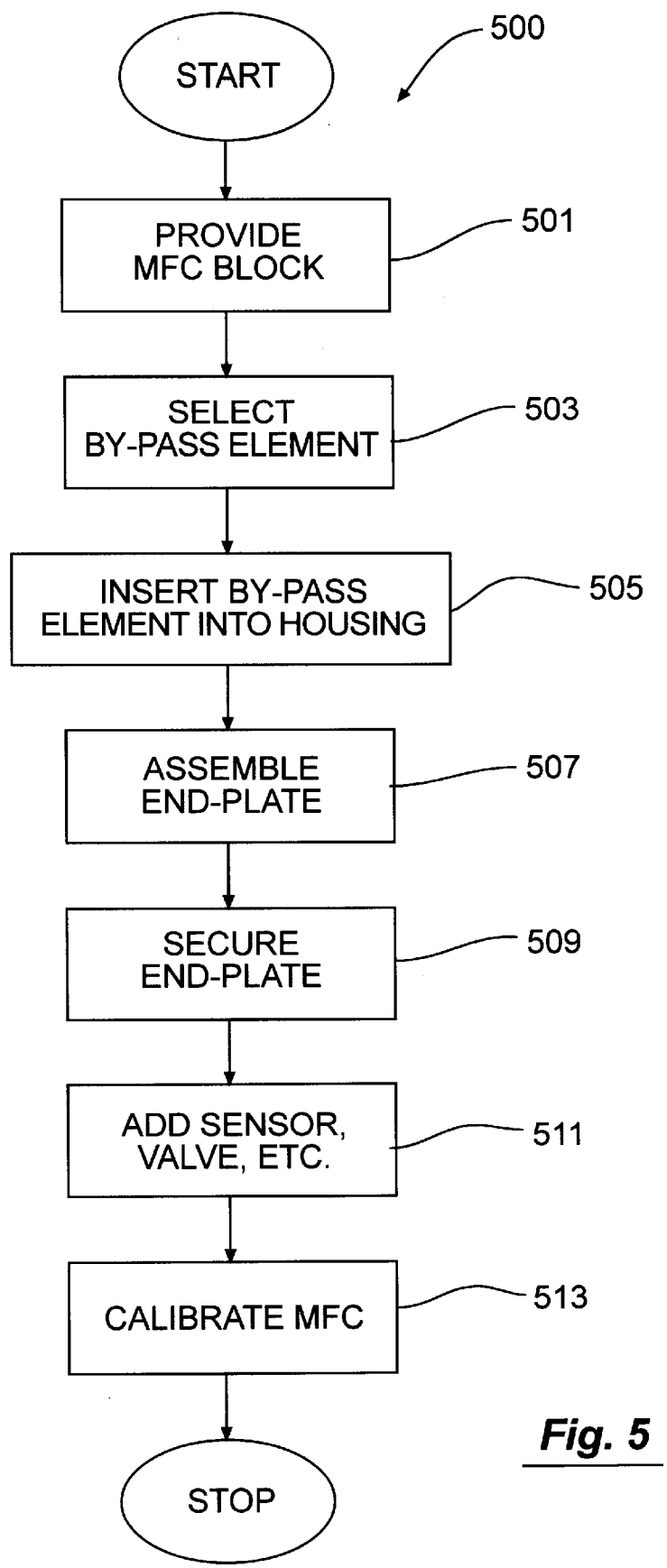
FIG. 5 is a simplified flow diagram of a method of fabricating or assembling a fluid flow controller according to the present invention.

FIG. 5 is a simplified flow diagram 500 of a method of fabricating or assembling a fluid flow controller according to the present invention. This diagram is merely an illustration and should not limit the scope of the claims herein. The method begins by providing a housing or block (step 501), which is used in the MFC. The housing or block can be similar to the one described above, but is not limited to such a housing or block. Depending upon a desired flow rate, a by-pass element for a selected fluid flow range is selected (step 503). The by-pass element can be selected from any one described above, but can be others.

The by-pass element can provide a variety of fluid flow rates. For instance, the by-pass element can provide for a fluid flow range from about 1 to about 5 liters/minute, as standardized to nitrogen gas flow under normal conditions. Additionally, a by-pass element can provide for a fluid flow range from about 5 to about 30 liters/minute, as standardized to nitrogen gas flow under normal conditions. Furthermore, a by-pass element can provide for a fluid flow range from about 30 to about 50 liters/minute or greater, as standardized to nitrogen gas flow under normal conditions. Moreover, a by-pass element can provide for a flow less than about 1 liter/minute, as standardized to nitrogen gas flow under normal conditions. Of course, the desired fluid flow rate will depend upon the application.

The by-pass element inserts (step 505) into a main chamber of the housing. An end-plate is assembled (step 507) over the inserted by-pass element. To secure (step 509) the end-plate and by-pass element to the housing, fasteners are used to affix the end-plate to the housing. The completed MFC also includes a sensing unit, control valve unit, and electronic controller (step 511). Before using the MFC, it is often calibrated (step 513) using, for example a non-reactive gas such as nitrogen.

Although the above sequence of steps is described in terms of a relatively fixed sequence of steps. The sequence of steps can be further modified, combined, and even separated. An important feature of the present sequence of steps is that a single housing can accommodate a variety of by-pass elements having different fluid flow rates, e.g., 1 SCCM ("standard cubic centimeters per minute") to 100 SLM of nitrogen equivalent. These benefits and others are described throughout the present patent specification and also below. The present invention also provides a relatively simple technique for modifying a fluid flow rate of an MFC.

3. MFC Fluid Flow Modification Techniques

In another aspect, the present method provides a relatively simple technique for modifying an MFC having a first range of fluid flow capacities to a second range of fluid flow capacities. In most embodiments, the second range of fluid flow capacities is substantially different from the first range. A method for modifying the MFC according to the present invention can be briefly described as follows:

(1) Provide MFC having a first range of fluid flow capacity;
(2) Disassemble fastener that secures end-plate to housing;
(3) Remove first by-pass element designed for first range of fluid flow;
(4) Select a second by-pass element for a second fluid flow range;
(5) Insert the second by-pass element into a main chamber of the housing;
(6) Assemble end-plate against inserted second by-pass element;
(7) Place fastener(s) to secure end-plate to housing; and
(8) Calibrate MFC to second fluid flow range.

The above sequence of steps provides for a single housing which can be modified with a variety of selected by-pass units to provide a wide range of fluid flow rate capabilities. The single housing unit can provide, for example, ease in modifying an MFC from a first fluid flow range to a second fluid flow range without changing the design of the housing. Preferably, steps (2) to (7) are optional. That is, the present MFC allows for a wide variety of flow rates by way of calibration. Details of these steps are provided by reference to the FIG. below.

Figure 6:
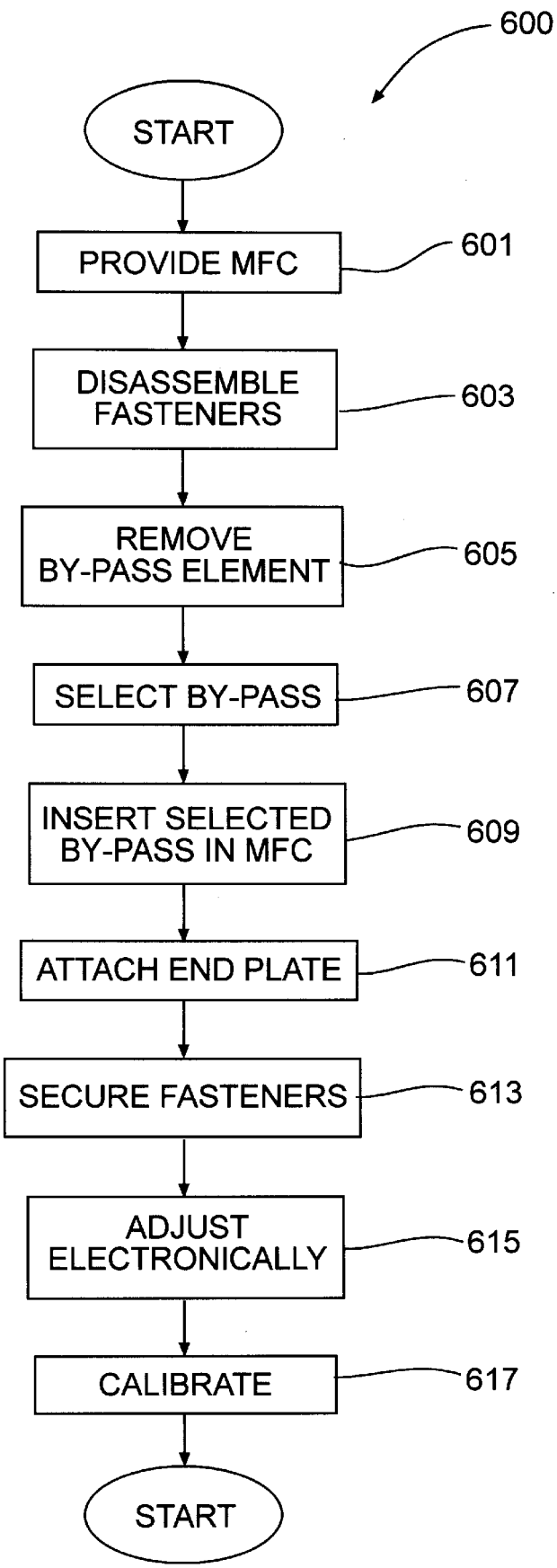
FIG. 6 is a simplified flow diagram of a method of modifying a fluid flow rate range in a fluid flow controller according to the present invention.

FIG. 6 is a simplified flow diagram 600 of a method of modifying a fluid flow range in a fluid flow controller according to the present invention. This diagram is merely an illustration and should not limit the scope of the claims herein. The flow diagram begins by providing (step 601) an MFC having a first range of fluid flow capacity. This MFC can be a used MFC, which has been removed from, for example, a wafer fabrication line. Alternatively, the MFC can be a stocked MFC, which is one of many and has no immediate usefulness in, for example, the fabrication line. The MFC, however, is not limited to these, but can be others.

The method includes a step of removing a by-pass element having the first fluid flow range from the MFC. In particular, a step of disassembling fasteners (step 603) that secure an end-plate of the housing on the MFC is performed. The housing is generally similar to the ones shown above, but can be others. The housing has novel features such as a main cavity and orifice(s) to be used with a variety of by-pass units having different fluid flow capacities and the like. After removing the end-plate, the first by-pass element is removed (step 605) from the housing, which leaves a substantially empty main cavity in the MFC.

The MFC can be modified to provide a second range of fluid flow rates, which are substantially different (but may overlap) from the first fluid flow rates. This modification occurs, in part, by selecting (step 607) a second by-pass element for a second fluid flow range. The second by-pass element can be similar to the ones discussed herein, but is not limited to such by-pass element. After selecting the second by-pass element, it inserts (step 609) into a main chamber of the housing. To secure the second by-pass element to the housing, the end-plate is attached (step 611) to the housing overlying the inserted second by-pass element. Fastener(s) secure (step 613) the end-plate to the housing.

The method often performs a variety of other modifications including electrical modifications to the MFC. For instance, the MFC can be adjusted electronically (step 615) to selectively provide the start-up characteristics of the MFC. The MFC can be set with selected jumper and alike, for a ramped start, a soft start, a step start, and others. The MFC also undergoes a step of calibration (step 617) to the second fluid flow range. Of course, the desired electrical modifications will often depend upon the applications.

To fully understand the modification process, it may be helpful to provide examples of a first fluid flow range and a second fluid flow range. The first fluid flow range may be about 1 to about 5 standard liters/minute, as standardized to nitrogen gas flow under normal conditions. Alternatively, the first fluid flow range can be about 5 to about 30 standard liters/minute, as standardized to nitrogen gas flow under normal conditions. Furthermore, the first fluid flow range can be about 50 to about 100 standard liters/minute or greater, as standardized to nitrogen gas flow under normal conditions. The first fluid flow range can also be less than about 1 standard liter/minute, as standardized to nitrogen gas flow under normal conditions. The second fluid flow range can be any of these indicated above, but is different from the first fluid flow range for the MFC being modified. The first fluid flow range, however, can overlap in part with the second fluid flow range. Selection of the second fluid flow range depends upon the particular application. Selection of the MFC depends upon availability, however. Preferably, the present method uses only an electrical adjustment or calibration to modify the MFC from one flow range to another flow range as noted.

Although the above descriptions with regard to modifying the MFC are in terms of a specific sequence of steps, these steps can be altered, separated, or even combined. Furthermore, modification of the MFC can occur, for example, at the vendor site or in-house, since it is relatively simple to perform. Modification of present MFCs allows, for example, a single MFC housing to be used in a variety of fluid flow applications, which are not available with pre-existing techniques. Accordingly, the present MFC provides greater flexibility and use over a wider range of applications.

While the above is a full description of the specific embodiments, various modifications, alternative constructions and equivalents may be used. For example, while the description above is in terms of using the MFC for semiconductor processing applications, it would be possible to implement the present invention with almost any application, including, for example, the manufacture of flat panel displays, hard disk drives, medical devices, or any other article of manufacture or chemical, which uses controlled fluid flow. Additionally, the invention can be applied to a variety of industries such as medical, petroleum, environmental, chemical, biomedical, materials, or the like. Therefore, the above description and illustrations should not be taken as limiting the scope of the present invention which is defined by the appended claims.

What is claimed is:

1. A fluid flow control device, said device comprising:
a main body:
an elongated fluid flow cavity in said main body, said fluid flow cavity being coupled to a fluid inlet;
a control valve coupled between said fluid flow cavity and a fluid outlet said control valve coupled to said fluid flow cavity by a first orifice;
wherein said elongated fluid flow cavity being disposed underlying a portion of said control valve to increase a fluid flow path of said elongated fluid flow cavity; and
wherein said first orifice couples to said fluid flow cavity at an angle that comprises a direction substantially opposite of fluid flow in said fluid flow cavity.

2. The device of claim 1 wherein said elongated fluid flow cavity has a substantially constant diameter from a first end to a second end to provide laminar flow.

3. The device of claim 2 wherein said second end comprises an annular shape to facilitate flow.

4. The device of claim 3 wherein said annular shape comprises rounded edges at a periphery of said elongated fluid flow cavity.

5. The device of claim 2 wherein said second end is coupled to said control valve through said first orifice.

6. The device of claim 5 wherein said first orifice is in said main body.

7. The device of claim 1 wherein said control valve is provided overlying an upper surface of said main body.

8. The device of claim 1 wherein said first orifice is a relatively straight channel region.

9. The device of claim 1 wherein said control valve is coupled to said fluid outlet through a second orifice.

10. The device of claim 9 wherein said second orifice is in said main body.

11. The device of claim 9 wherein said second orifice couples to said main body at an angle that comprises a direction substantially parallel to fluid flow in said elongated fluid flow cavity.

12. The device of claim 11 wherein said second orifice is a relatively straight channel region.

13. The device of claim 1 further comprising a sensing unit coupled to said elongated fluid flow cavity.

14. The device of claim 13 wherein said sensing unit is provided overlying an upper surface of said main body.

15. The device of claim 13 wherein said sensing unit is coupled to said elongated fluid flow cavity for incoming fluid through a first sensing orifice.

16. The device of claim 15 wherein said first sensing orifice is a relatively straight channel region.

17. The device of claim 16 wherein said relatively straight channel region is disposed perpendicular to said elongated fluid flow cavity.

18. The device of claim 16 wherein said relatively straight channel region is disposed perpendicular to fluid flow in said elongated fluid flow cavity.

19. The device of claim 15 wherein said sensing unit is coupled to said elongated fluid flow cavity for outgoing fluid through a second sensing orifice.

20. The device of claim 19 wherein said first sensing orifice is a relatively straight channel region.

21. The device of claim 20 wherein said relatively straight channel region is disposed perpendicular to said elongated fluid flow cavity.

22. The device of claim 20 wherein said relatively straight channel region is disposed perpendicular to fluid flow in said elongated fluid flow cavity.

23. The device of claim 1 wherein said main body comprises a length of about three inches and less.

24. The device of claim 1 wherein said main body is a block.

25. The device of claim 1 wherein said fluid inlet is a fluid outlet.

26. The device of claim 1 wherein said fluid outlet is a fluid inlet.

27. A mass flow control device, said device comprising:
a main body;
an elongated fluid flow cavity in said main body, said fluid flow cavity being coupled to a fluid inlet;
a removable by-pass element disposed in said elongated fluid flow cavity, said by-pass element comprising a first plurality of laminar flow tubes, said by-pass element configured for removal from said main body; and
a control valve coupled between said fluid flow cavity and a fluid outlet;
wherein said elongated fluid flow cavity is disposed underlying a portion of said control valve to increase a fluid flow path of said laminary flow tube, said elongated fluid flow path underlying at least 50% of a width of said control valve.

28. The device of claim 22 further comprising a sensing unit coupled to said elongated fluid flow cavity for sensing a fluid flow related to said plurality of laminar flow tubes.

29. The device of claim 28 wherein said sensing unit is adapted to sense said fluid flow by determining a change in temperature of a fluid flow through said sensing unit.

30. The device of claim 28, said sensing unit further comprising a heater.

31. The device of claim 27 wherein said main body is adapted to receive a second removable by-pass element after said first removable by-pass element has been removed, said second by-pass element having a second plurality of laminar flow tubes.

32. A mass flow control device, said device comprising:
a main body:
an elongated fluid flow cavity in said main body, said fluid flow cavity being coupled to a fluid inlet;
a removable by-pass element disposed in said elongated fluid flow cavity, said by-pass element comprising a laminar flow tube;
a control valve coupled between said fluid flow cavity and a fluid outlet;
a first orifice coupling said control valve to said fluid flow cavity, said first orifice at an angle that comprises a direction substantially opposite of fluid flow in said elongated fluid flow cavity; and
wherein said elongated fluid flow cavity is disposed underlying a portion of said control valve to increase a fluid flow path of said laminary flow tube.

33. The device of claim 32 further comprising a sensing device coupled to said elongated fluid flow cavity, said sensing device being adapted to sense a fluid flow related to said laminar flow tube.

34. The device of claim 32, said bypass element further comprising a plurality of liar flow tubes.

35. The device of claim 34 further comprising a sensing device coupled to said elongated fluid flow cavity, said sensing device being adapted to sense a fluid flow related to said plurality of laminar flow tubes.

36. The device of claim 32 wherein said elongated fluid flow cavity has a length that is at least 70 percent as long as a length of said removable by-pass element.

37. The device of claim 32 wherein said elongated fluid flow cavity has a length that is at least 90 percent as long as a length of said removable by-pass element.

* * * * *